United States Patent

Colombera

[19]

[11] Patent Number: 6,089,053

[45] Date of Patent: Jul. 18, 2000

[54] WASHING MACHINE WITH IMPROVED ANCHORING MEANS FOR THE WASHING ASSEMBLY

[75] Inventor: Giovanni Colombera, Pordenone, Italy

[73] Assignee: Electrolux Zanussi S.p.A., Pordenone, Italy

[21] Appl. No.: 09/207,189

[22] Filed: Dec. 8, 1998

[30] Foreign Application Priority Data

Dec. 22, 1997 [IT] Italy ................................ PN97A0070

[51] Int. Cl.[7] ................................................ D06F 37/22
[52] U.S. Cl. ........................... 68/23.1; 68/23.2; 242/638; 210/144
[58] Field of Search .................... 68/23.1, 23.2; 248/636, 638; 210/144

[56] References Cited

U.S. PATENT DOCUMENTS

| 2,296,261 | 9/1942 | Breckenridge et al. | .................. 68/23.1 |
| 2,613,837 | 10/1952 | Morton | ..................... 68/23.1 |
| 2,651,482 | 9/1953 | O'Connor | .................. 68/23.3 |
| 4,577,826 | 3/1986 | Bergstrom et al. | ..................... 248/638 |
| 5,520,029 | 5/1996 | Savkar | ..................... 68/23.3 |
| 5,613,380 | 3/1997 | Savkar | ..................... 68/23.1 |

FOREIGN PATENT DOCUMENTS

| 111336 | 8/1944 | Denmark | ................. 68/23.3 |
| 1216800 | 5/1966 | Germany | ................. 68/23.1 |
| 2837801 | 2/1980 | Germany | ................. 68/23.1 |
| 59-149184 | 8/1984 | Japan | ..................... 68/23.3 |
| 62-277996 | 12/1987 | Japan | ..................... 68/23.3 |
| 1557220 | 4/1990 | Russian Federation | ................ 68/23.1 |

*Primary Examiner*—Frankie L. Stinson
*Attorney, Agent, or Firm*—Pearne & Gordon LLP

[57] ABSTRACT

A household-type washing machine or similar appliance in which the washing assembly (3) is anchored to the stationary structure (1) by one or more anchoring devices (2). Each anchoring device includes at least two elastic elements (10, 20) arranged in series. Firmly secured to each elastic element is a rigid element (15, 25) whose free end portion (15) protrudes beyond the other elastic element (20). The elastic elements (10, 20) work in this manner as compression elastic means and the elastic constant of the anchoring devices (2) readily and automatically adapts to the different conditions that happen to prevail during a washing cycle.

11 Claims, 3 Drawing Sheets

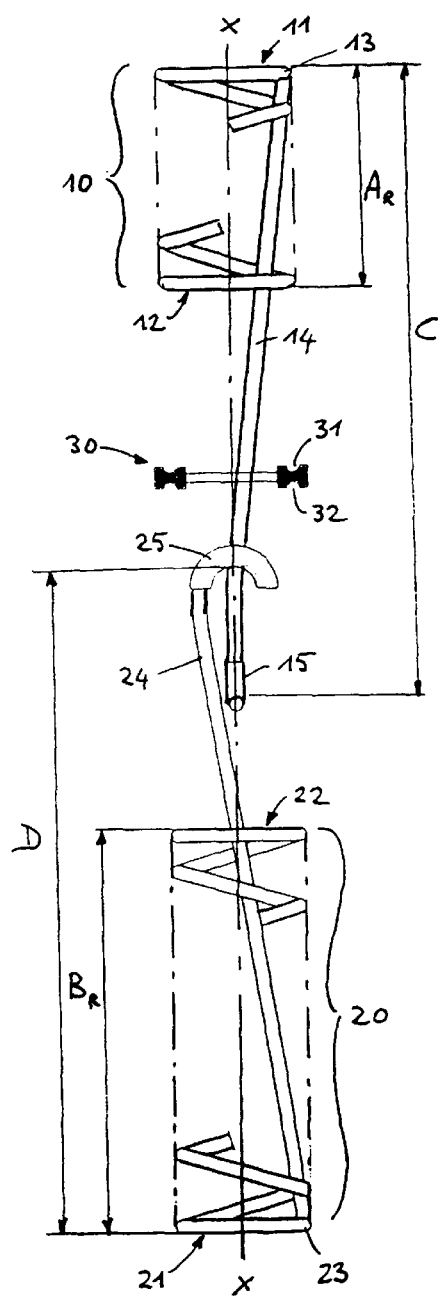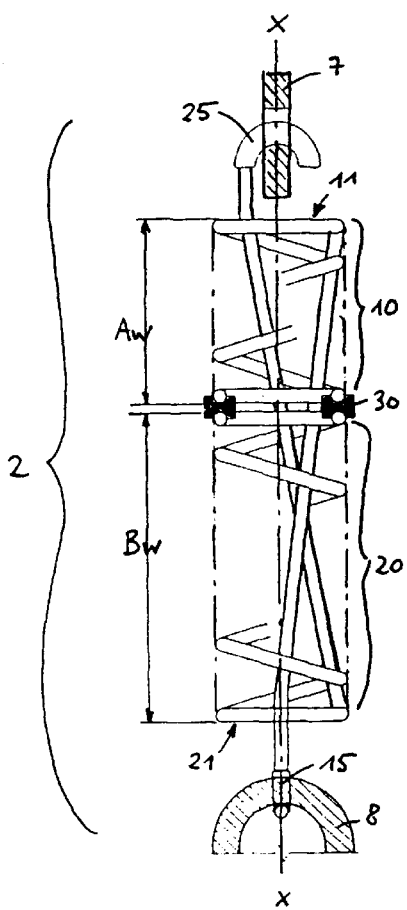

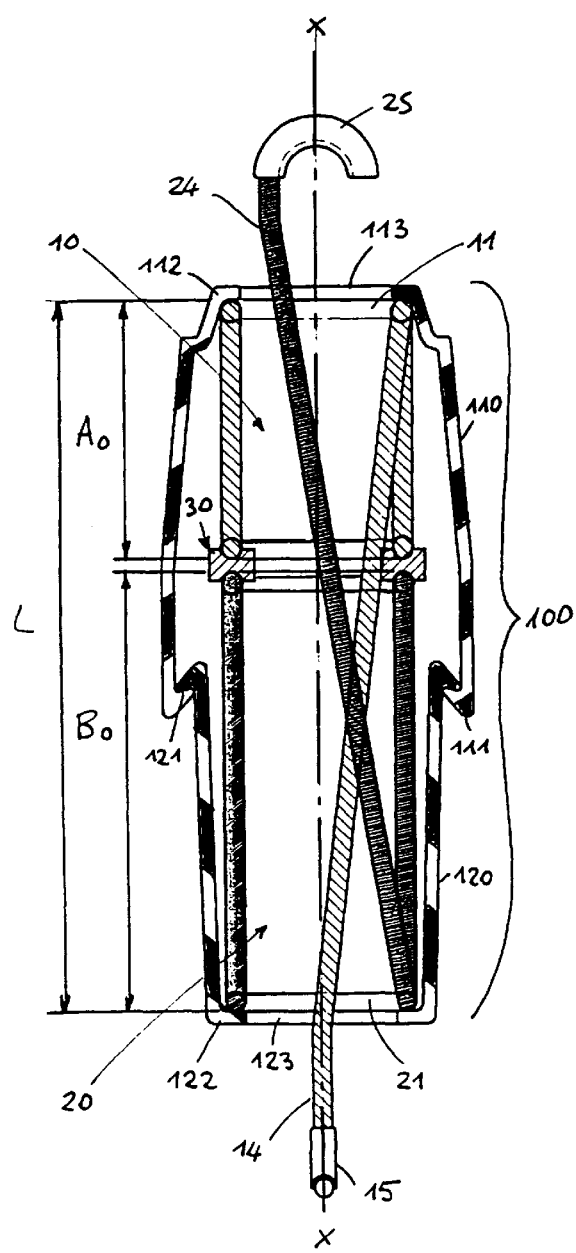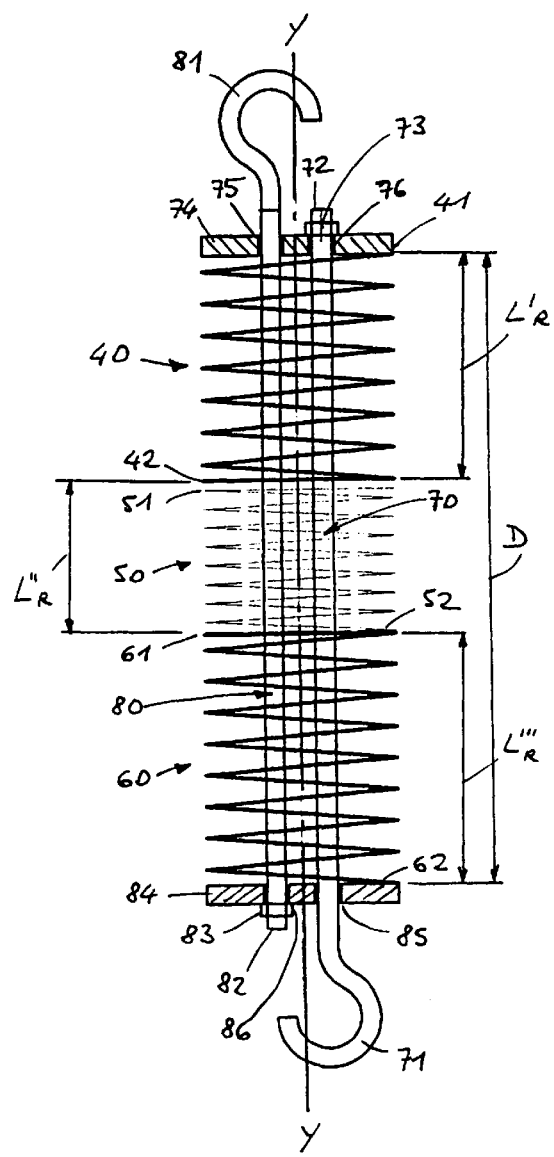

WASHING MACHINE WITH IMPROVED ANCHORING MEANS FOR THE WASHING ASSEMBLY

BACKGROUND OF THE INVENTION

The present invention refers to a washing machine, in particular such a washing machine for residential and similar uses. As used here, the term washing machine shall be understood to include also similar appliances, such as washer-driers.

Washing machines are generally known to comprise an outer stationary structure (which is generally referred to as "casing") and an internal washing or oscillating assembly which includes a tub enclosing and supporting a rotating drum driven by an electric motor. Elastic or spring elements, which may sometimes be integrated into friction-type shock-absorbing anchoring devices, are generally used to anchor such a washing assembly to said outer stationary structure.

Examples of the prior art are the washing machines disclosed in FR-A-2 531 461, EP-A-80 243 and EP-A-265 004.

BRIEF SUMMARY OF THE INVENTION

It is a main purpose of the present invention to provide an improved anchoring of the washing assembly to the outer stationary structure for facilitating fabrication of the washing machine, reducing costs and boosting reliability thereof. These are of paramount importance for mass-manufacturing companies with an output that usually reaches up to several hundreds of thousands of units per year.

BRIEF DESCRIPTION OF THE SEVERAL VIEWS OF THE DRAWING

A washing machine having the features as recited in the appended claims enables these and further aims to be reached, as will become more readily apparent from the detailed description that is given below by way of non-limiting example with reference to the accompanying drawings, in which:

FIG. 2 is a front view of a first embodiment of a washing assembly anchoring device according to the present invention, before its component parts are assembled;

FIG. 3 is a view of the device of FIG. 2 in its fully assembled condition and installed in a washing machine such as the one illustrated in FIG. 1;

FIG. 4 is a view of a variant of the above cited embodiment, upon completion of the assembly of the component parts thereof; and FIG. 5 is a view of a second embodiment of a washing assembly anchoring device according to the present invention, with its component parts in their assembled condition.

DESCRIPTION OF THE INVENTION

Figure 1:
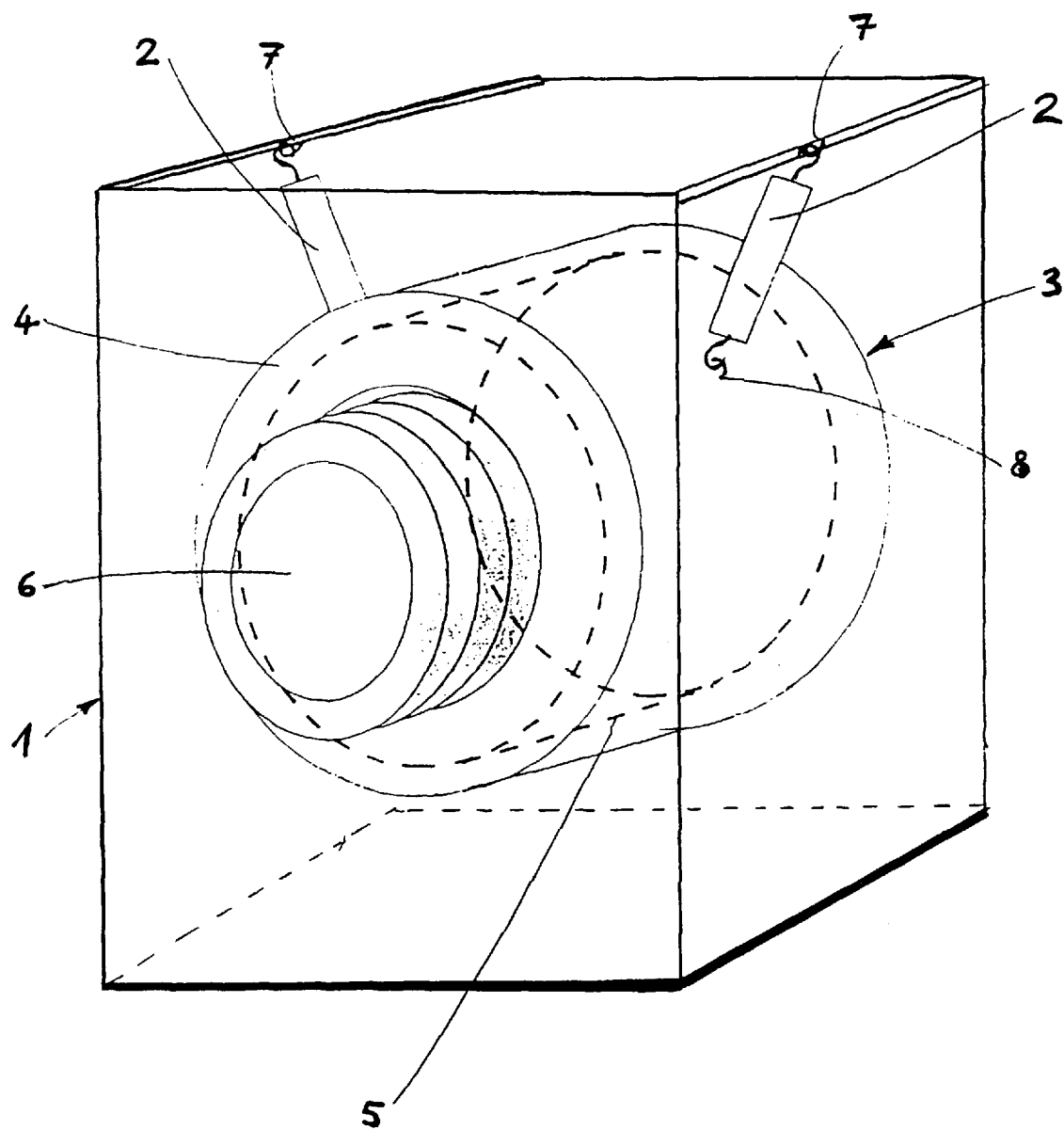
FIG. 1 is a simplified schematic view of a household washing machine of the front-loading type.

With particular reference to FIG. 1, a household-type washing machine includes an outer stationary structure 1, in the form of an outer casing. At least one pair of anchoring devices 2 elastically anchors a washing assembly 3 to the stationary structure. The washing assembly 3 includes an approximately cylindrical tub 4 that accommodates a drum 5 that is arranged to rotate about a substantially horizontal axis as driven by an electric motor (not shown).

The anchoring devices 2 are hooked to eyelets 7, which are integral with side walls of the stationary structure 1. Opposite ends of the anchoring devices are hooked to eyelets 8 that are integral with an outer surface of the tub 4 and, therefore, integral with the washing assembly 3. Loading and unloading of the clothes to be washed, ie. the washload, occur through a circular aperture 6 provided in the front portion of the washing assembly 3. An associated aperture, capable of being closed with a corresponding door (not shown), is provided in the front wall of the stationary structure 1.

The washing machine is not described here any further in its overall construction owing to the fact that no further details are needed to ensure an adequate understanding the present invention. The washing machine might alternatively be of the top-loading type, considering the universal nature of the anchoring means according to the present invention as far as the application scope thereof is concerned.

A first embodiment of the anchoring device 2 for the washing assembly 3 according to the present invention, as illustrated in FIGS. 2 and 3, includes a pair of special compression-type helical springs 10 and 20, which extend along a same axis x—x. An annular seat 30 is arranged therebetween.

The first such helical spring 10, whose end portions 11 and 12 consist of a first and a second circular coil, has a length $A_R$ along the axis x—x when at rest. From said first end coil 11 of the spring 10, at a point 13, a relatively rigid prolongation 14 extends in an uninterrupted manner. Said prolongation 14, which is substantially rectilinear, extends inwardly into the spring 10. A free end 15, which is in the shape of a hook, is aligned along the common axis x—x of the two springs 10 and 20. The second such helical spring 20, whose ends 21 and 22 consist again of a first and a second circular coil, has in turn a length $B_R$, along the axis x—x when at rest. The length BR is greater than said length $A_R$ of said first spring 10 when the latter is at rest. From said first end coil 21 of the spring 20, at a point 23, a relatively rigid prolongation 24 extends in an uninterrupted manner. Said prolongation 24, which is substantially rectilinear, extends inwardly into the spring 20. A free end 25, which is in the shape of a hook, is aligned along the common axis x—x of the two springs 10 and 20.

For completing the assembly in view of obtaining an anchoring device 2, said second end coils 12 and 22 are pressed against an upper face 31 and a lower face 32, respectively, of said annular seat 30. The upper and lower faces are appropriately shaped so as to enable the two springs 10, 20 to link up with each other along a transverse plane with respect to their common axis x—x. Assembly requires inserting the prolongation 14 that extends from the first spring 10 inside the second spring 20 and, correspondingly, inserting the prolongation 24 that extends from the second spring 20 inside the first spring 10. Such an operation may be simplified if the lengths along the axis x—x of the prolongations 14 and 24 (indicated at C and D in FIG. 2) are both greater than the lengths $A_R$ and $B_R$ of the springs 10 and 20. However, this shall not be intended as a limiting feature of the present invention.

According to a main feature of the present invention, when an anchoring device 2 is installed in a washing machine, the hook 15 that forms the free end of the prolongation 14 extending from the first helical spring 10 comes into a position in which it is protruding beyond the free end 21 of the second helical spring 20 and is attached to an eyelet 8. The hook 25 that forms the free end of the prolongation 24 extending from the second helical spring 20 comes into a position in which it protrudes beyond the free end 11 of the first helical spring 10 and is able to be attached on to an eyelet 7. It will of course be appreciated that the device 2 can also be installed inverted, so that the hook 25 is anchored on to the eyelet 8 provided on the washing assembly 3 and the hook 15 on to the eyelet 7 provided in the stationary structure 1 of the washing machine.

Upon having been loaded with the clothes to be washed, and the water required to perform the related washing cycle, the washing assembly 3 may weigh as much as 35 kg. This causes the hooks 15 and 25 to move away from each other and, therefore, brings about a further compression of the springs 10 and 20 which become shorter along their common axis x—x. The springs remain linked to each other by the action of the annular seat 30 thereof and are compressed to lengths $A_w$ and $B_w$, respectively, as best shown in FIG. 3.

Preferably, when compressed, at least the shorter spring 10 is fully compressed (ie. "into a pack"). Thus, the shorter spring 10 has a length $A_w=A_{mn}$ in such a manner that the anchoring device 2 becomes very rigid. In this way, the invention offers the practical advantage that the washing assembly 3 is substantially still, ie. does not move, with respect to the stationary structure 1 of the washing machine, without any risk of shocks, throughout the various phases of the washing cycle that are carried out with the drum 5 full of clothes and wash liquid and rotating at a low speed (for instance in the order of approximately 60 to 80 rpm).

When, in accordance with the washing cycle, the wash liquid is drained from the drum 5 and the drum is driven to rotate at a high revolution speed (which may reach up to as many as 1,500 rpm) for a final spin-extraction phase, the washing assembly 3 is considerably lightened. The weight may be in the order of 22 kg or so. This contributes to reducing the compression stress which is imposed or the anchoring device 2. The springs 10 and 20 extend at this point to lengths $A_s>A_w$ and $B_s>B_w$, respectively, which are anyhow sufficient to ensure that the hooks 15 and 25 keep protruding beyond the free ends 21 and 11, respectively, while remaining linked up to each other owing to said second end coils 12 and 22 engaging the faces 31 and 32 of the annular seat.

When the drum 5 of the washing machine rotates at a high speed, the springs 10 and 20 work in series with each other, so that the elastic constant of the anchoring device 2 reaches such a value as to effectively reduce the transmission of the oscillations of the washing assembly 3 to the stationary structure 1, this being effective in bringing about obvious advantages, particularly in the case of unbalanced washloads in the rotating drum.

It clearly emerges from the above description that, from a construction point of view, the anchoring device 2 has a particularly simple and low-cost construction, so that it ultimately has minimal impact on the overall cost of the washing machine. From an operational point of view, the described anchoring device has the advantage that its elastic constant has the ability of immediately and automatically adapting to the different conditions that are encountered during a washing cycle, ie. the different weights of the washing assembly 3 and the different revolving speeds of the rotating drum 5.

A variant of this first embodiment of the present invention is illustrated in FIG. 4 and uses a housing 100 around the anchoring device 2 as described above with reference to FIGS. 2 and 3. The housing 100 includes a first and a second portion 110 and 120 each in the shape of a cup. These are made of injection-molded plastic material and are snap-fitted together along mouth portions at respective male protrusions 111 and female protrusions 121. Most appropriately, through the use of a suitable tool, said two portions 110 and 120 of said housing 100 can subsequently be separated from each other, for instance in the case that repairs have to be carried out in the course of the life of the washing machine in which said anchoring device is installed.

The springs 10 and 20 are housed in said housing 100 in such a manner that their first end coils 11 and 21 are capable of abutting against the inner surfaces of bottom portions 112 and 122. Their second end coils 12 and 22 ensure that the springs remain mutually linked up by means of the annular seat 30. In this way, the springs 10 and 20 are compressed and reach a length of $A_o<A_R$ and $B_o<B_R$, respectively, so that the distance between the bottom portions turn out to be $L \cong (A_o+B_o)$.

In each bottom portion 112 and 122 there is provided an elongated aperture 113 and 123, respectively, to enable the hooks 15 and 25, which form the free ends of the prolongations 14 and 24, to protrude from the housing 100 when the anchoring device is mounted in the washing machine between the washing assembly 3 and the stationary structure 1. It therefore ensues that during the operation of the machine, which takes place in exactly the same manner as described earlier with reference to FIGS. 1 and 2, more or less conspicuous clearances remain (depending on the different conditions occurring during a washing cycle) between the first end coils 11 and 21 of the springs 10 and 20 and the therewith associated bottom portions 112 and 122 of the housing 100. In order to limit the amplitude of the oscillations of the prolongations 14 and 24 of the springs 10 and 20 in a direction which extends transversely with respect to the axis x—x, rubber noise-damping blocks (not shown in FIG. 4, but well known in the art) can suitably be inserted in the eyelets 113 and 123.

In any case, the housing 100 is used for protecting the springs 10 and 20, as well as the annular seat 30, thereby making it easier and more convenient for the anchoring device to be handled up to the moment in which it is installed in the washing machine. Thus, the housing may be manufactured using low-grade plastic material, ie. a plastic material with reduced mechanical properties.

A second embodiment calls for at least one washing assembly anchoring device of the type illustrated in FIG. 5 to be mounted in a washing machine. This anchoring device includes three helical springs 40, 50 and 60, of which at least one has a shorter length than the others. The three springs are arranged in series along a same axis y—y. The upper spring 40 has its lower end 42 welded or otherwise joined to the upper end 51 of the intermediate spring 50, while the lower end 52 of this intermediate spring is welded or otherwise joined to the upper end 61 of the lower spring 60.

Inside said three springs there are extending two parallel metal rods 70 and 80, whose free ends 71 and 81 are in the shape of hooks, while their opposite end portions 72 and 82 are threaded. Two rigid plates 74 and 84 arranged perpendicularly to the axis y—y are each provided with a pair of holes 75, 76 and 85, 86, respectively, through which the opposite end portions 81, 72 and 71, 82, respectively, of said rods are able to pass. Lock-nuts 73 and 83 are screwed on to said threaded end portions 72 and 82 in such a manner as to firmly join the upper spring 40 with the first rod 70 through its upper end 41 and the plate 74, and the lower spring 60 with the second rod 80 through its lower end 62 and the plate 84. The distance D at rest between the plates 74 and 84 upon completion of the assembly of the anchoring device can be adjusted by means of the lock-nuts 73 and 83, but will be always shorter than the sum of the uncompressed lengths $L'_R$, $L''_R$ and $L'''_R$ of the three helical springs 40, 50 and 60, which therefore are subject to a compression-type stress. In a similar manner as described above, such a compression stress is greater when the anchoring device is mounted in the washing machine between the washing assembly 3 and the stationary structure 1. For instance, the hook-shaped end portion 71 of the first rod 70 is attached to an eyelet that is integral with the stationary structure, while the hook-shaped end portion 81 of the second rod 80 is attached to the washing assembly.

The operation of the anchoring device remains substantially unaltered with respect to the afore described one. In other words, the device is very rigid when the shorter spring, ie. the intermediate spring 50 in this particular case, is fully compressed ("into a pack") during the phases of the washing cycle that are carried out with the drum rotating at a slow revolution speed, after having been loaded with the clothes to be washed and the wash liquid. The device is very elastic during the phases that are carried out at a high revolution speed of the rotating drum, after the wash liquid has been let off the tub, since the three springs arranged in series give rise to a very high elastic constant which is particularly beneficial in view of the ability of reducing the transmission of the oscillations of the washing assembly to the stationary structure.

It will be appreciated that a number of further embodiments and variants of the present invention may be developed by those skilled in the art without departing from the scope of the present invention. For example, the device described above with reference to FIG. 5 might be housed in a two-part housing, or different elastic means might be used instead of the above described helical springs, as long as they operate in a compression mode.

What is claimed is:

1. A washing machine comprising:
    a washing assembly (3) including a wash tub (4) and a rotating drum (5);
    a stationary structure (1); and
    at least one anchoring device (2) anchoring the washing assembly to the stationary structure, wherein the anchoring device includes at least first and second elastic elements (10, 20; 40, 50, 60) arranged in series with respect to each other,
    the first elastic element (10; 40) having a first rigid element (14; 70) integral with a first end portion (11; 41) of the first elastic element and a free end portion (15; 71) of the first rigid element anchored to the washing assembly (3),
    the second elastic element (20; 60) having a second rigid element (24; 80) integral with a first end portion of the second elastic element and a free end portion (25; 81) of the second rigid element anchored to the stationary structure (1), and
    the free end, portion (15; 71) of the first rigid element (14; 70) is able to protrude beyond the first end portion (20; 60) of the second elastic element (20; 60) and the free end portion (25; 81) of the second rigid element (24; 80) is able to protrude beyond the first end portion (11; 41) of the first elastic element (10; 40).

2. A washing machine according to claim 1, characterized in that the free ends (15, 25; 71, 81) of said first and said second rigid element (14, 24; 70, 80) are in the form of hooks.

3. A washing machine according to claim 1, characterized in that said rigid elements (14, 24) comprise prolongations extending uninterruptedly from a point (13, 23) on said first end portion (11, 21) of the respective elastic element (10, 20) through the elastic elements (10, 20).

4. A washing machine according to claims 1 or 3, characterized in that said first and second elastic elements (10, 20) are in the form of helical springs extending along a same axis (x—x), which are joined to each other by opposite faces (31, 32) of an annular seat (30) extending transversely with respect to their axis (x—x) and capable of retaining coils defining the second end portions (12, 22) of the same springs (10, 20).

5. A washing machine according to any of the claims 1 to 3, characterized in that the free end portions (15, 25; 71, 81) of said first and second rigid elements (14, 24; 70, 80) are substantially aligned along a same axis (x—x; y—y).

6. A washing machine according to claim 1 or 2, characterized in that said first and second elastic elements (40, 60) are helical springs that are joined to each other at end portions (51, 52) of a third helical spring (50) interposed therebetween and extending along a same axis (y—y).

7. A washing machine according to claim 6, characterized in that said rigid elements comprise rods (70, 80) extending parallel to said elastic elements (40, 50, 60) the rods having end portions (72, 82) that are solidly joined to said first end portion (41, 62) of said first and said second elastic elements (40, 60) by a screw thread, a lock-nut (73, 83) and a pair of rigid plates (74, 84) arranged perpendicular to the axis (y—y) of the same springs.

8. A washing machine according to any of claims 1 to 3, characterized in that during a part of the washing cycle, at least one of said elastic elements (10; 50) is fully compressed.

9. A washing machine according to any of claims 1 to 3, characterized in that said elastic elements (10, 20) are enclosed in a housing (100) provided with apertures (113, 123) in the form of elongated eyelets capable of accommodating removable inserts to guide said rigid elements (14, 24) during the oscillations of the washing assembly, in a manner that their respective free end portions (15, 25) are able to pass therethrough and protrude therefrom.

10. A washing machine according to claim 9, characterized in that said housing (100) comprises two parts (110, 120) which are prevailingly made of plastic material and are integrally provided with separable joinable means (111, 121) enabling said parts to be fastened together.

11. A washing machine according to claim 6, characterized in that said elastic elements (10, 20) are enclosed in a housing (100) provided with apertures (113, 123) in the form of elongated eyelets capable of accommodating removable inserts to guide said rigid elements (14, 24) during the oscillations of the washing assembly, in a manner that their respective free end portions (15, 25) are able to pass therethrough and protrude therefrom.

* * * * *

UNITED STATES PATENT AND TRADEMARK OFFICE
CERTIFICATE OF CORRECTION

PATENT NO.  :  6,089,053
DATED       :  July 18, 2000
INVENTOR(S) :  Colombera

It is certified that error appears in the above-identified patent and that said Letters Patent is hereby corrected as shown below:

On Title Page, Foreign Application Priority Data, Section [30], delete "PN97A0070", and insert --PN97A000070--.

Column 2, line 36, delete "BR", and insert --B,--.

Signed and Sealed this

Third Day of April, 2001

Attest:

NICHOLAS P. GODICI

Attesting Officer

Acting Director of the United States Patent and Trademark Office